US010930250B2

(12) United States Patent
Yoshitomi et al.

(10) Patent No.: US 10,930,250 B2
(45) Date of Patent: Feb. 23, 2021

(54) INFORMATION CONTROL APPARATUS

(71) Applicant: Marelli Corporation, Saitama (JP)

(72) Inventors: Teruo Yoshitomi, Saitama (JP);
Yuusuke Tanizawa, Saitama (JP);
Haruhiko Satou, Saitama (JP);
Soichiro Aoyagi, Saitama (JP)

(73) Assignee: Marelli Corporation, Saitama (JP)

( * ) Notice: Subject to any disclaimer, the term of this patent is extended or adjusted under 35 U.S.C. 154(b) by 0 days.

(21) Appl. No.: 16/613,675

(22) PCT Filed: Apr. 13, 2018

(86) PCT No.: PCT/JP2018/015605
§ 371 (c)(1),
(2) Date: Nov. 14, 2019

(87) PCT Pub. No.: WO2018/211881
PCT Pub. Date: Nov. 22, 2018

(65) Prior Publication Data
US 2020/0273433 A1 Aug. 27, 2020

(30) Foreign Application Priority Data
May 18, 2017 (JP) .............................. JP2017-099258

(51) Int. Cl.
G09G 5/38 (2006.01)
B60K 35/00 (2006.01)
G09G 5/36 (2006.01)

(52) U.S. Cl.
CPC ............... G09G 5/38 (2013.01); B60K 35/00 (2013.01); G09G 5/363 (2013.01);
(Continued)

(58) Field of Classification Search
None
See application file for complete search history.

(56) References Cited

U.S. PATENT DOCUMENTS 10,452,224 B2 * 10/2019 Jang .................. G04G 21/08
2002/0072848 A1 6/2002 Hamada et al.
(Continued)

FOREIGN PATENT DOCUMENTS

JP H9-257500 A 10/1997
JP 2002-181563 A 6/2002
(Continued)

OTHER PUBLICATIONS

International Preliminary Report on Patentability dated Nov. 19, 2019 from International Application No. PCT/JP2018/015605.

Primary Examiner — Jwalant Amin
(74) Attorney, Agent, or Firm — Young Basile Hanlon & MacFarlane, P.C.

(57) ABSTRACT

The information control apparatus optimizes display control based on safety around a vehicle and a driver's level of ease regarding driving. An information control apparatus according to an embodiment includes a vehicle information acquisition interface that acquires information related to a vehicle, a driver information acquisition interface that acquires information related to a driver, and a controller that predicts the safety around the vehicle and the level of ease of the driver regarding driving based on the information related to the vehicle and the information related to the driver. The controller controls display information based on the safety and the level of ease.

9 Claims, 10 Drawing Sheets

(52) U.S. Cl.
  CPC ............... *B60K 2370/1529* (2019.05); *B60K 2370/166* (2019.05); *B60K 2370/167* (2019.05); *B60K 2370/182* (2019.05); *B60K 2370/52* (2019.05); *B60K 2370/736* (2019.05); *G09G 2354/00* (2013.01); *G09G 2380/10* (2013.01)

(56) References Cited

U.S. PATENT DOCUMENTS

| | | | | |
|---|---|---|---|---|
| 2013/0073934 | A1* | 3/2013 | Ogawa | G11B 27/10 |
| | | | | 715/204 |
| 2016/0185219 | A1* | 6/2016 | Sakata | B60K 35/00 |
| | | | | 701/36 |
| 2017/0102855 | A1* | 4/2017 | Kwon | G06F 3/04847 |
| 2017/0147396 | A1 | 5/2017 | Sekimoto et al. | |
| 2018/0112992 | A1 | 4/2018 | Akaho | |
| 2018/0266842 | A1* | 9/2018 | Di Censo | G01C 21/3641 |

FOREIGN PATENT DOCUMENTS

| | | | |
|---|---|---|---|
| JP | 2006-138994 A | | 6/2006 |
| JP | 2008241309 A | * | 10/2008 |
| JP | 4376295 B2 | | 12/2009 |
| JP | 2010237953 A | * | 10/2010 |
| JP | 2015-022537 A | | 2/2015 |
| JP | 2016-024711 A | | 2/2016 |
| JP | 2016-186721 A | | 10/2016 |
| JP | 2016186721 A | * | 10/2016 |
| WO | 2016171017 A1 | | 10/2016 |

\* cited by examiner

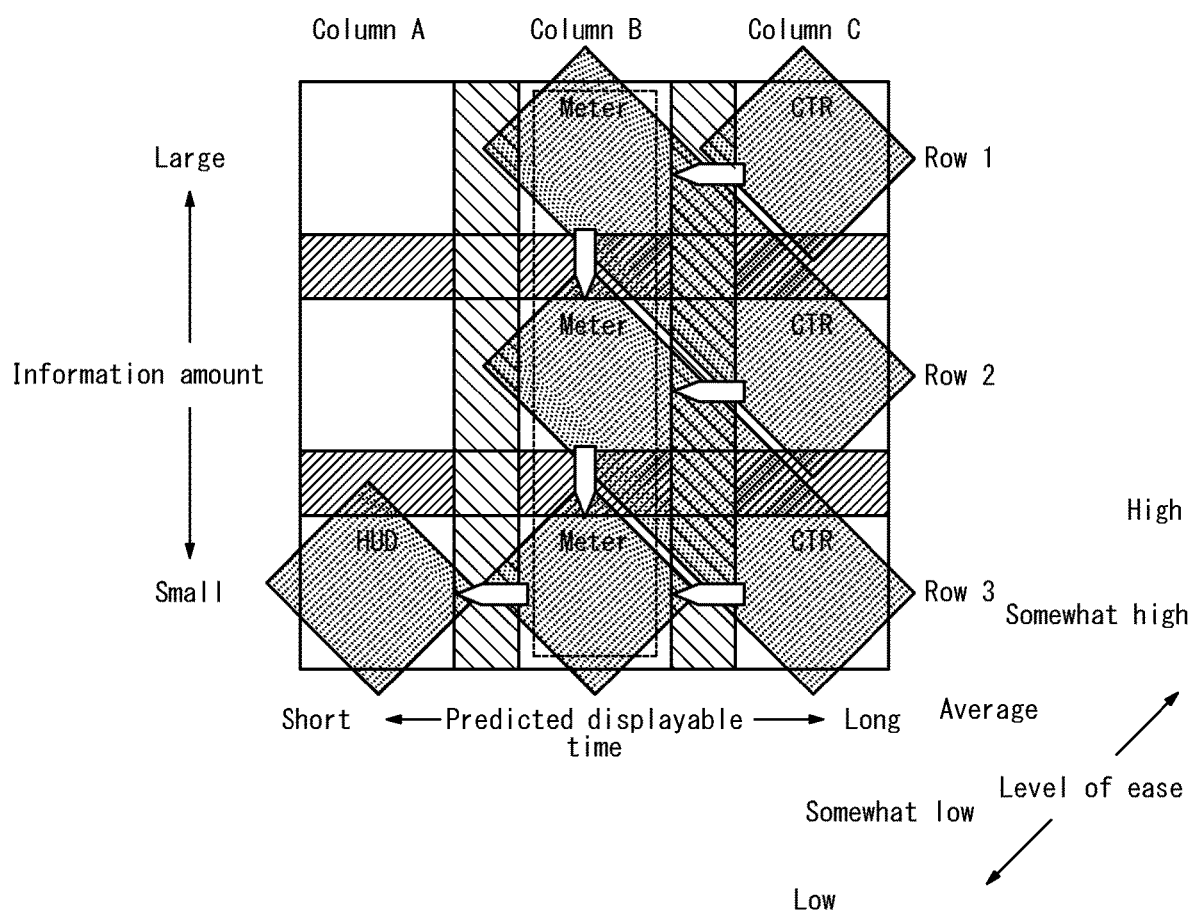

INFORMATION CONTROL APPARATUS

CROSS-REFERENCE TO RELATED APPLICATIONS

The present application is a 371 application of International Application Serial No. PCT/JP2018/015605, filed on Apr. 13, 2018, which claims priority to and the benefit of Japanese Patent Application No. 2017-099258 filed May 18, 2017, the entire contents of which are incorporated herein by reference.

TECHNICAL FIELD

The present disclosure relates to an information control apparatus mounted in a vehicle.

BACKGROUND

A variety of information is displayed on a car navigation apparatus mounted in a vehicle, allowing a driver or the like to obtain necessary information.

The car-mounted navigation apparatus disclosed in JP4376295B2 changes a displayed logo mark to be more visible in accordance with vehicle driving conditions such as the vehicle speed, the type of road the vehicle is being driven on, and the frequency of use of facilities.

SUMMARY

A predetermined monitor mounted in a vehicle typically cannot display information that is not directly related to driving while the car is moving. On the other hand, a predetermined monitor mounted in a vehicle can display any information, regardless of the conditions surrounding the vehicle, when the vehicle is completely stopped. Such display control may not be optimal, however, when considering the environment around the vehicle and the state of the driver.

The present disclosure has been conceived in light of this problem and provides an information control apparatus that optimizes display control based on safety around the vehicle and the driver's level of ease regarding driving.

To resolve the aforementioned problem, an information control apparatus according to an embodiment of the present disclosure includes:

a vehicle information acquisition interface configured to acquire information related to a vehicle;

a driver information acquisition interface configured to acquire information related to a driver; and a controller configured to predict safety around the vehicle and a level of ease of the driver regarding driving based on the information related to the vehicle and the information related to the driver and configured to control display information based on the safety and the level of ease.

An embodiment of the present disclosure can provide an information control apparatus that optimizes display control based on safety around the vehicle and the driver's level of ease regarding driving.

BRIEF DESCRIPTION OF THE DRAWINGS

In the accompanying drawings:

FIG. 7 is a schematic diagram illustrating a fifth example of display information control performed by the controller of FIG. 1;

DETAILED DESCRIPTION

An embodiment of the present disclosure is described below with reference to the drawings.

Display Information Control Based on Safety and Level of Ease

An information control apparatus 1 according to an embodiment predicts the safety of the surroundings of a vehicle and the level of ease of a driver regarding driving based on vehicle-related information and driver-related information. The information control apparatus 1 controls display information based on the safety and level of ease. First, control of display information performed by the information control apparatus 1 is described in detail.

Figure 1:
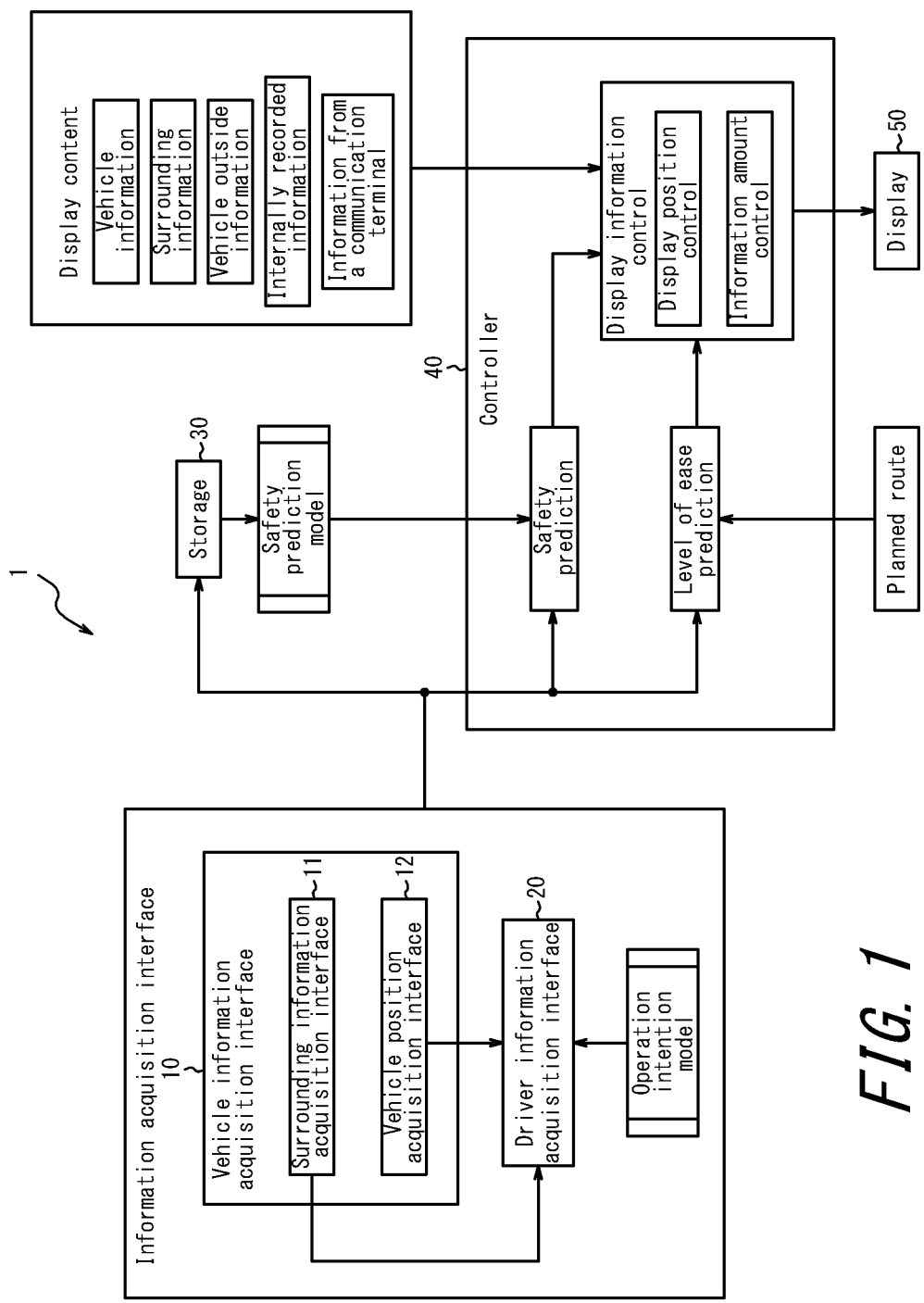
FIG. 1 is a block diagram illustrating an information control apparatus according to an embodiment.
Figure 2:
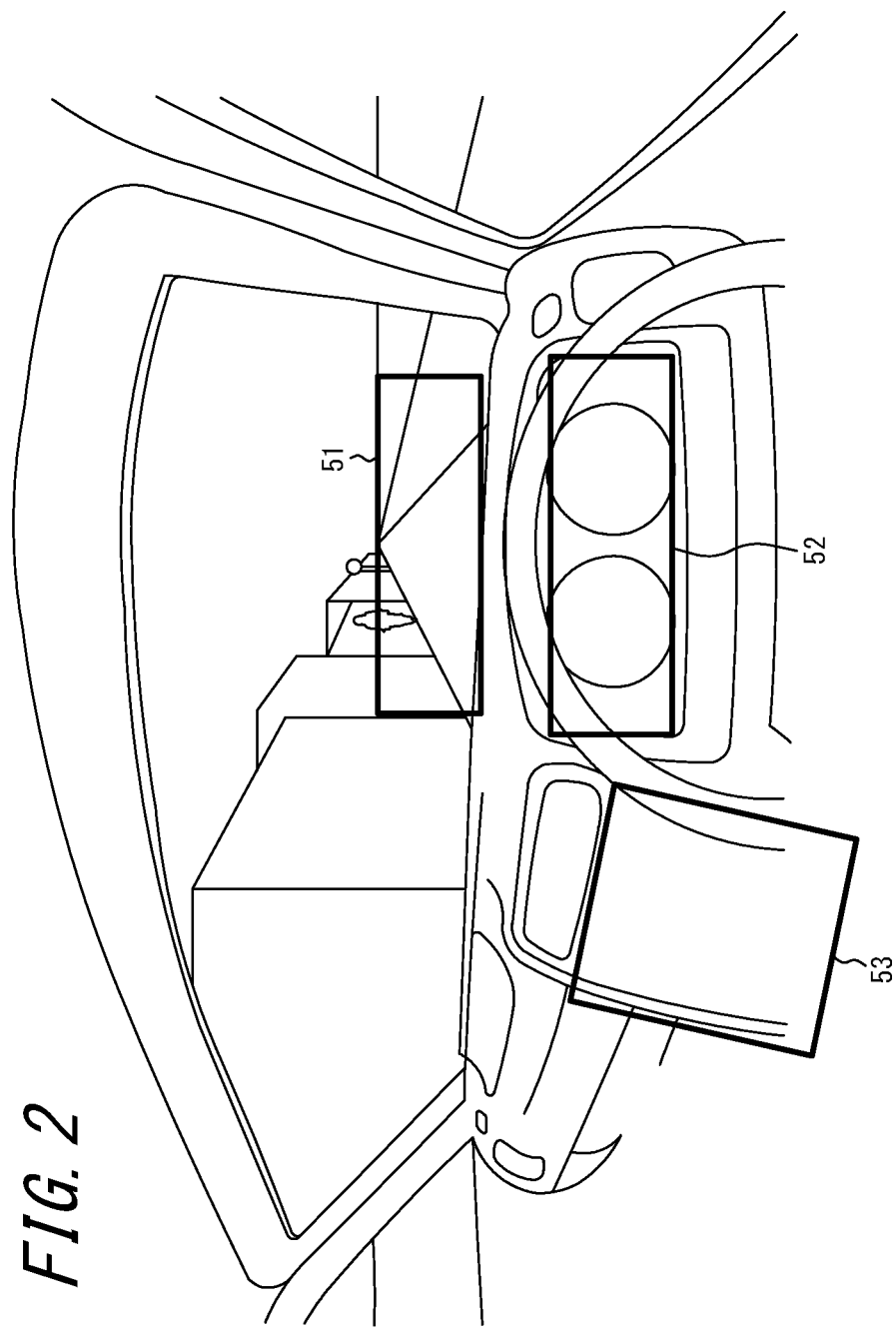
FIG. 2 is a schematic diagram illustrating the configuration of a display of FIG. 1.

FIG. 1 is a block diagram illustrating the information control apparatus 1 according to an embodiment. FIG. 2 is a schematic diagram illustrating the configuration of a display 50 of FIG. 1. The information control apparatus 1 includes an information acquisition interface, a storage 30, a controller 40, and the display 50. The information acquisition interface is configured by a vehicle information acquisition interface 10 and a driver information acquisition interface 20.

The vehicle information acquisition interface 10 includes a surrounding information acquisition interface 11 and a vehicle position acquisition interface 12. The vehicle information acquisition interface 10 acquires vehicle-related information using the surrounding information acquisition interface 11 and the vehicle position acquisition interface 12. The vehicle-related information includes environment information around the vehicle and the current position of the vehicle, as described below.

The vehicle information acquisition interface 10 acquires various other vehicle-related information. The vehicle information acquisition interface 10 may, for example, acquire various information related to vehicle conditions using a controller area network (CAN), which is one communication method in an in-vehicle network. For example, the vehicle information acquisition interface 10 may acquire information related to vehicle conditions such as the vehicle speed, accelerator state, brake state, clutch state, turn signal state, gear state, windshield wiper state, side mirror state, seat state, audio state, warning state, light state, steering state, idle state, air conditioner state, seat belt state, and driving operation level.

The surrounding information acquisition interface 11 is configured by suitable sensors such as a camera, light detection and ranging (LiDAR), and radar. For example, the surrounding information acquisition interface 11 may include appropriate sensors forming an advanced driver-assistance system (ADAS). The surrounding information acquisition interface 11 may include an appropriate communication apparatus for performing vehicle-to-vehicle and road-to-vehicle (V2X) communication. The surrounding information acquisition interface 11 detects traffic participant conditions, such as the characteristics, positions, and movement speed of traffic participants; road conditions, such as the state of the road surface, the distance between lane markings on the road, the type of road, and the number of lanes; traffic light conditions; and the like to acquire environment information around the vehicle. The surrounding information acquisition interface 11 may acquire information related to at least one of the conditions of vehicles ahead, conditions of vehicles behind, conditions of vehicles in parallel, and conditions of intersecting vehicles. Additionally, the surrounding information acquisition interface 11 may acquire environment information around the vehicle such as information related to the state of communication with an external network, information related to conditions of moving objects in the surrounding sky, external server information, and point of interest (POI) information.

The vehicle position acquisition interface 12 is configured by a navigation system or the like. The vehicle position acquisition interface 12 calculates the current position of the vehicle indicated by the latitude, longitude, altitude, inclination, lane position, and the like of the vehicle. The vehicle position acquisition interface 12 may acquire information related to vehicle position conditions, such as the temperature, humidity, weather, brightness, degree of transparency, and the like at the current position of the vehicle.

The driver information acquisition interface 20 is configured by appropriate sensors, such as a camera and a wearable sensor, and a control CAN or the like. The driver information acquisition interface 20 acquires driver-related information. For example, the driver information acquisition interface 20 acquires information related to driver operations. In particular, the driver information acquisition interface 20 detects driving operations by the driver. The driver information acquisition interface 20 additionally acquires information related to the operation intention of the driver based on vehicle-related information, acquired by the surrounding information acquisition interface 11 and the vehicle position acquisition interface 12, and an operation intention model stored in the storage 30 or the like. The driver information acquisition interface 20 detects the driving operation intention of the driver.

For example, the driver information acquisition interface 20 acquires information related to operations by the driver such as an accelerator operation, brake operation, clutch operation, turn signal operation, gear operation, windshield wiper operation, side mirror operation, seat operation, audio operation, light operation, steering operation, air conditioner operation, and seat belt operation.

The driver information acquisition interface 20 may acquire other information related to the state of the driver. For example, the driver information acquisition interface 20 may acquire information related to the state of the driver such as the biological state, face orientation, gaze, blinking state, body movement, degree of excitement, degree of sentiment, enjoyment, satisfaction, emotions, desires, continuous driving (riding) time, visibility (glare), audibility, utterances, and the like of the driver. The biological information of the driver may include the degree of arousal, brain waves, cerebral blood flow, blood pressure, blood glucose level, blood amino acids, HbA1c, γ-GPT, blood concentration of medications, heart rate, body temperature, apparent temperature, hunger, fatigue, and the like. The driver information acquisition interface 20 has been described as acquiring these pieces of driver-related information, but this configuration is not limiting. The driver information acquisition interface 20 may acquire similar information related to a passenger.

The above information acquired by the information acquisition interface formed by the vehicle information acquisition interface 10 and the driver information acquisition interface 20 is outputted to the storage 30 and the controller 40.

The storage 30 can be configured by a semiconductor memory, a magnetic memory, or the like. The storage 30 stores the various information described above, programs for causing the information control apparatus 1 to operate, and the like. The storage 30 also functions as a working memory.

The controller 40 is a processor that controls and manages the entire information control apparatus 1, including the functional blocks of the information control apparatus 1. The controller 40 is configured by a processor such as a central processing unit (CPU) that executes programs with prescribed control procedures. Such programs are, for example, stored in the storage 30.

The controller 40 predicts the safety of the surroundings of the vehicle based on the vehicle-related information acquired by the vehicle information acquisition interface 10 and the driver-related information acquired by the driver information acquisition interface 20, and based on a safety prediction model stored in the storage 30 or the like.

The controller 40 predicts the level of ease of the driver regarding driving based on the vehicle-related information acquired by the vehicle information acquisition interface 10 and the driver-related information acquired by the driver information acquisition interface 20. For example, based on a planned route set in advance by the driver or the like, the controller 40 predicts the level of ease of the driver regarding driving along the planned route. In addition to predicting such a level of ease, the controller 40 may use vehicle-related information acquired by the vehicle information acquisition interface 10 to perform real-time correction, in accordance with actual conditions, of the level of ease that was predicted when the planned route was set. The controller 40 may perform real-time correction, in accordance with the state of the driver, of the predicted level of ease based on driver-related information acquired by the driver information acquisition interface 20.

The vehicle-related information and the driver-related information used to predict safety and level of ease may each include at least one of the various pieces of information acquired by the vehicle information acquisition interface 10 and the driver information acquisition interface 20.

The controller 40 controls display information to output to the display 50 based on the predicted safety and level of ease. For example, the controller 40 controls at least one of the display position and information amount of the display information in accordance with the level of ease of the driver under conditions in which safety is ensured. The controller 40 outputs the controlled display information to the display 50.

As illustrated in FIG. 1, there are various types of display information, i.e. display content. For example, the display content is broadly classified into vehicle information, surrounding information, vehicle outside information, internally recorded information, and information from a communication terminal. The vehicle information includes information related to the vehicle speed, fuel level, and tire air pressure, for example. The surrounding information includes environment information around the vehicle sensed by the sensors configuring the surrounding information acquisition interface 11. For example, the surrounding information includes information related to the speed limit and other signs. The vehicle outside information includes information on the outside of the vehicle, other than the surrounding information. For example, the vehicle outside information includes external open information, such as map information, infrastructure information, traffic information, and POI information. The internally recorded information includes local information, stored in the storage 30 or the like, that does not correspond to any of the vehicle information, surrounding information, and vehicle outside information. The information from a communication terminal includes information, or a history thereof, acquired via an in-vehicle or personal communication terminal. For example, the information from a communication terminal includes information such as an emergency disaster bulletin, an extra edition, e-mail, a social networking service (SNS) message, news, and weather.

The display 50 displays the display information outputted from the controller 40. The display 50 displays various types of display content. The display 50 includes at least one screen. The display 50 may be configured by any display apparatus, such as a liquid crystal display. The display 50 is disposed in the instrument panel, for example, when configured by a liquid crystal display. The display apparatus configuring the display 50 may be a touch panel display or a display incapable of touch operations. The display 50 may include a meter display disposed in the instrument panel. The display 50 may include a head-up display (HUD) apparatus. In this case, the HUD apparatus includes a light emitter that emits display information as display light. The HUD apparatus reflects the generated display light towards an observer, such as a driver, to display a virtual image beyond the front windshield. The observer is not limited to the driver and may, for example, be a passenger seated in the passenger seat.

As illustrated in FIG. 2, the display 50 is described in the example below as being configured by three screens. Specifically, the display 50 is described as being configured by an HUD 51, a meter display 52, and a center display 53.

Control of display information performed by the controller 40 is described below in detail using FIG. 3 through FIG. 8B.

Figure 3:
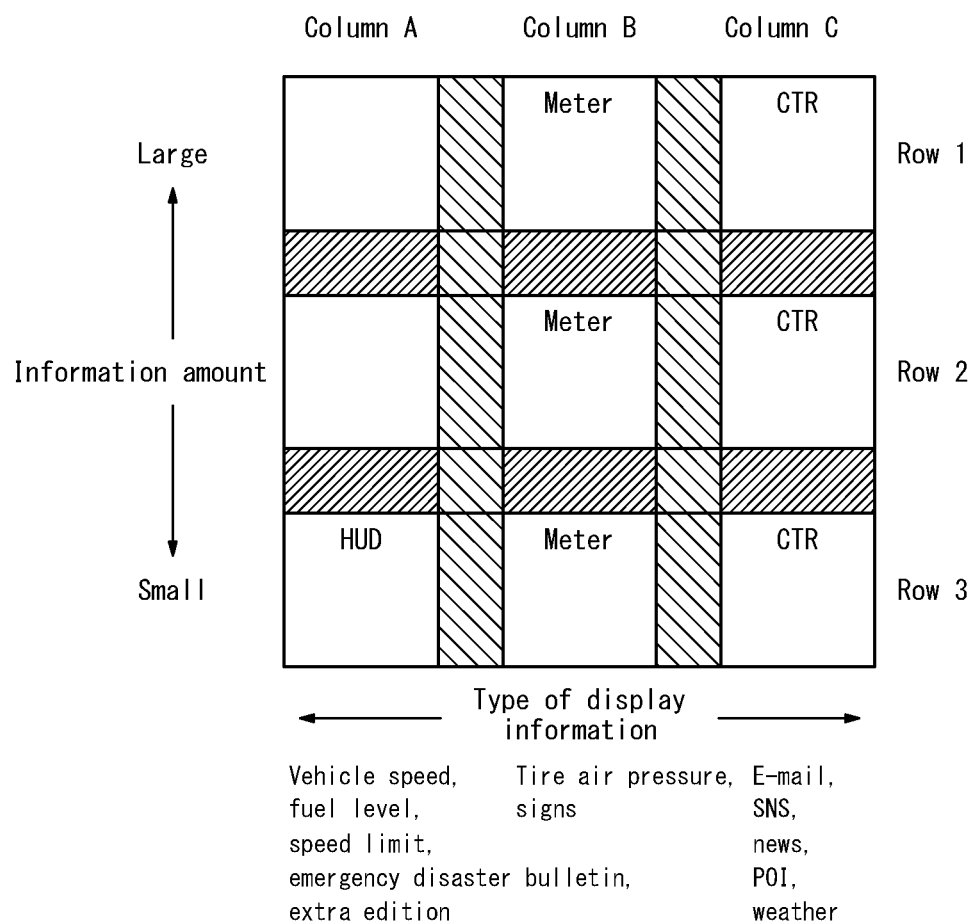
FIG. 3 is a schematic diagram illustrating a first example of display information control performed by the controller of FIG. 1.

FIG. 3 is a schematic diagram illustrating a first example of display information control performed by the controller 40 of FIG. 1.

The controller 40 determines the display position based on the type of display information. For example, the controller 40 associates the three screens, i.e. the HUD 51, meter display 52, and center display 53, respectively with column A, column B, and column C. The controller 40 sorts the display information by type into one of column A, column B, and column C in light of the urgency and importance of the display information. For example, the controller 40 sorts display information with a high urgency or importance into column A. The controller 40 sorts display information with a low urgency or importance into column C. The controller 40 sorts display information that has average urgency or importance and does not correspond to either column A or column C into column B.

For example, the controller 40 associates information related to the vehicle speed, fuel level, speed limit, emergency disaster bulletin, and extra edition, which all have high urgency or importance, with column A and sorts the information to be displayed on the HUD 51. The controller 40 associates information related to e-mail, SNS messages, news, POI, and weather, which all have low urgency or importance, with column C and sorts the information to be displayed on the center display 53 (CTR). The controller 40 associates information related to the tire air pressure and signs, which both have average urgency or importance, with column B and sorts the information to be displayed on the meter display 52 (Meter).

The controller 40 may process display information transmitted by predetermined senders by changing the display position of the information by sender. The controller 40 may reregister the display information with any of the HUD 51, the meter display 52, and the center display 53 by sender when a plurality of senders are registered, as with e-mail or SNS messages. The controller 40 may differentiate an emergency disaster bulletin with particularly high urgency from other display information in advance to sort the emergency disaster bulletin. For example, the controller 40 may sort an emergency disaster bulletin onto not only the HUD 51 but also the meter display 52 and the center display 53 simultaneously.

The controller 40 may further sort the display information in each column into one of three rows based on the information amount of the display information. For example, the controller 40 sorts display information with a large information amount into row 1. The controller 40 sorts display information with a small information amount into row 3. The controller 40 sorts display information that has an average information amount and does not correspond to either row 1 or row 3 into row 2.

Here, the controller 40 determines the information amount of the display information from a chunk count (number of chunks) defined by a character count, a word count, a count of phrases, icons, and figures, or a count of attention points in graphic form. The controller 40 is not limited to these examples and may determine the information amount of the display information by any method allowing objective measurement.

The controller 40 calculates the time until viewing of display information by the driver from the determined information amount. The time until viewing also depends on the type of display 50. For example, the HUD 51 is positioned in front of the driver's eyes and overlaps the driver's line of sight when the driver is concentrating on the direction of vehicle movement. The time until viewing is therefore relatively short for the HUD 51. On the other hand, the center display 53 can display a relatively large amount of information, and the driver needs to move the line of sight to see the center display 53. The time until viewing is therefore relatively long for the center display 53. In this way, the column A, column B, and column C respectively corresponding to the HUD 51, the meter display 52, and the center display 53 also correspond to the time until viewing. The time until viewing increases from column A to column C.

The controller 40 has been described as sorting the display information into columns in light of urgency and importance, but this configuration is not limiting. The controller 40 may determine the display position based on the information amount of the display information. For example, the controller 40 sorts display information with a small information amount and a short time until viewing into column A. The controller 40 sorts display information with a large information amount and a long time until viewing into column C. The controller 40 sorts display information that has an average information amount and does not correspond to either column A or column C into column B. For example, for content other than display content with a predetermined format, such as e-mail sent by another person, the controller 40 may determine the information amount from the above-described chunk count and sort into one of column A through column C based on the information amount.

Figure 4:
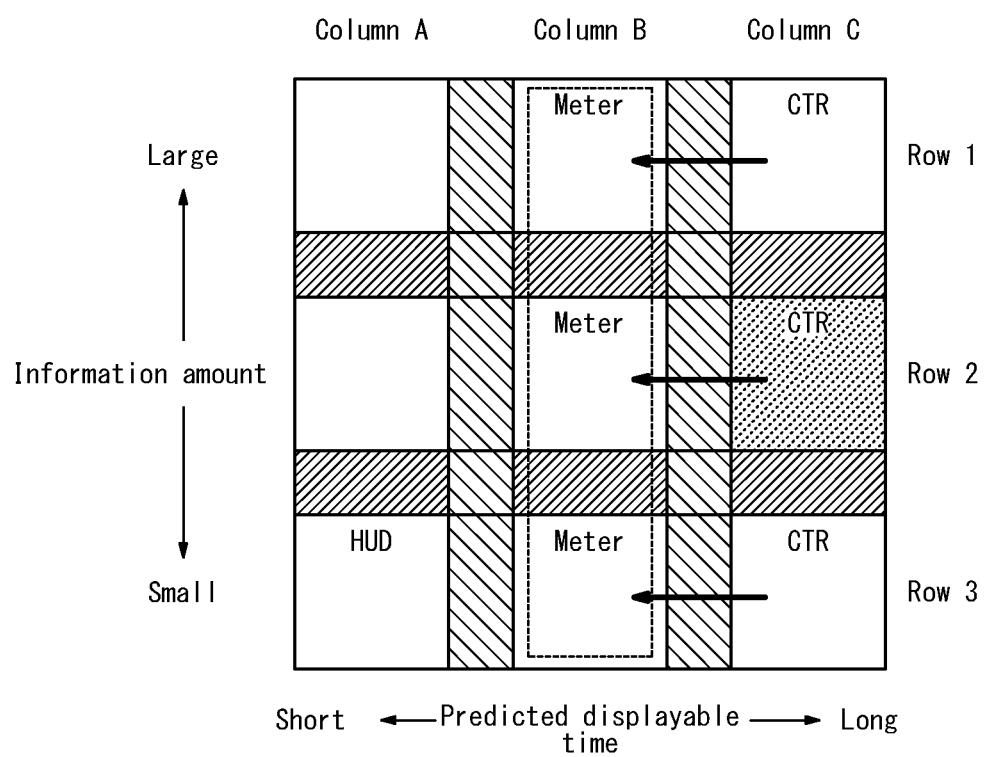
FIG. 4 is a schematic diagram illustrating a second example of display information control performed by the controller of FIG. 1.
Figure 5:
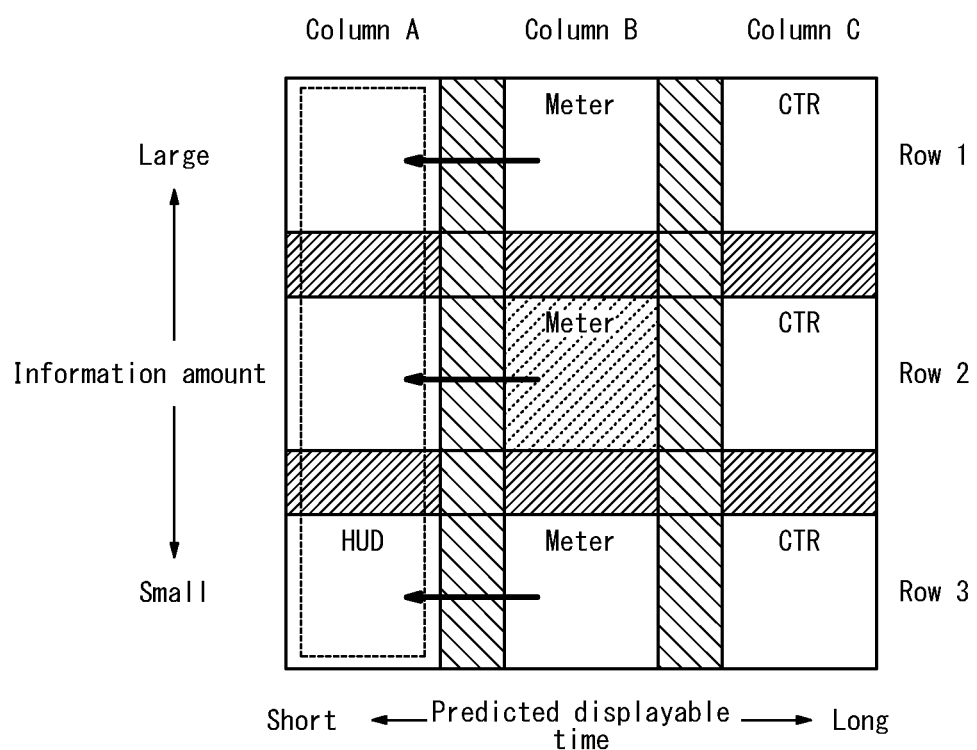
FIG. 5 is a schematic diagram illustrating a third example of display information control performed by the controller of FIG. 1.
Figure 6:
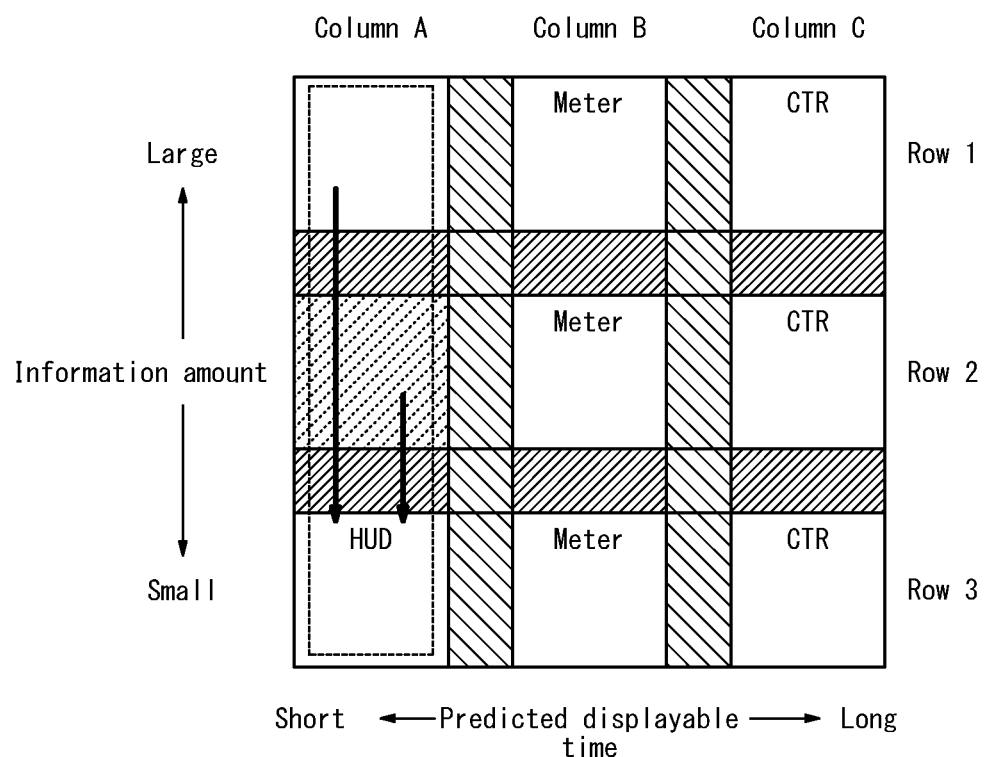
FIG. 6 is a schematic diagram illustrating a fourth example of display information control performed by the controller of FIG. 1.

FIG. 4 is a schematic diagram illustrating a second example of display information control performed by the controller 40 of FIG. 1. FIG. 5 is a schematic diagram illustrating a third example of display information control performed by the controller 40 of FIG. 1. FIG. 6 is a schematic diagram illustrating a fourth example of display information control performed by the controller 40 of FIG. 1. The controller 40 controls at least one of the display position and information amount of the display information based on a predicted displayable time determined by the planned route of the vehicle and the predicted safety. The predicted displayable time may, for example, be the time during which information can be displayed safely until the vehicle enters an intersection, as calculated based on the distance to the intersection and the speed of the vehicle.

For example, the controller 40 associates the predicted displayable time, judged based on the planned route and the safety, with column A, column B, and column C. The controller 40 may, for example, associate a short predicted displayable time with column A and a long predicted displayable time with column C.

As illustrated in FIG. 4, an example of the controller 40 associating the predicted displayable time with column B and controlling the display information sorted into column C, row 2 is considered. The time until viewing of the display information in column C, row 2 at this time is longer than the predicted displayable time associated with column B. In this case, the controller 40 moves the display information in column C, row 2 to column B, row 2. The controller 40 reselects a display 50 with a shorter time until viewing so that the time until viewing becomes equal to or less than the predicted displayable time. The controller 40 performs the same control as above for the display information sorted into column C, row 1 and column C, row 3 as well. The controller 40 makes no changes for the display information sorted into column A, for which the time until viewing is shorter than the predicted displayable time.

As illustrated in FIG. 5, an example of the controller 40 associating the predicted displayable time with column A and controlling the display information sorted into column B, row 2 is considered. The time until viewing of the display information in column B, row 2 at this time is longer than the predicted displayable time associated with column A. In this case, the controller 40 moves the display information in column B, row 2 to column A, row 2. The controller 40 reselects a display 50 with a shorter time until viewing so that the time until viewing becomes equal to or less than the predicted displayable time. The controller 40 performs the same control as above for the display information sorted into column B, row 1 and column B, row 3 as well. Similarly, the controller 40 moves the display information sorted into column C to the same row in column A.

The controller 40 may place a limit on the information amount of display information based on the type or position of the display 50. The controller 40 may reduce the information amount based on this limit. For example, when the controller 40 moves the display information to column A, row 1 or column A, row 2 after comparing the time until viewing and predicted displayable time, the controller 40 again moves the display information to column A, row 3, which has the smallest information amount, as illustrated in FIG. 6. The controller 40 reduces the information amount of this display information. For example, the controller 40 may reduce the information amount by at least one of summarizing and extracting the display information. Since information is displayed in overlap with the background on the HUD 51, information might be missing if the character count becomes too large. The controller 40 therefore preferably reduces the information amount as described above for column A. The controller 40 is not limited to this example. The controller 40 may also place predetermined limits on the information amount of display information for columns B and C and reduce the information amount based on these limits.

FIG. 7 is a schematic diagram illustrating a fifth example of display information control performed by the controller 40 of FIG. 1.

The controller 40 controls the display position and the information amount of the display information based on the predicted level of ease of the driver regarding driving. In greater detail, the controller 40 classifies the predicted level of ease of the driver into five stages and associates the stages with squares arranged diagonally on the matrix, as illustrated in FIG. 7. When the level of ease is low, the controller 40 associates column A, row 3 with the level of ease. When the level of ease is somewhat low, the controller 40 associates column B, row 3 with the level of ease. When the level of ease is average, the controller 40 associates column B, row 2 and column C, row 3 with the level of ease. When the level of ease is somewhat high, the controller 40 associates column B, row 1 and column C, row 2 with the level of ease. When the level of ease is high, the controller 40 associates column C, row 1 with the level of ease.

For example, suppose that the display information is moved to column B, row 2 after a comparison between the time until viewing and the predicted displayable time, and that the level of ease is somewhat low. The display information has been moved to a matrix position that is one stage higher than the driver's classified level of ease. Accordingly, the controller 40 reduces the information amount of this display information and moves the display information to column B, row 3.

Suppose the display information is sorted into column C, row 1, and the level of ease is somewhat low. The display information has been sorted into a matrix position that is three stages higher than the driver's classified level of ease. Accordingly, the controller 40 first changes the display position of the display information to the meter display 52, which has a shorter time until viewing. In other words, the controller 40 moves the display information from column C, row 1 to column B, row 1. Within column B, the controller 40 then reduces the information amount of the display information and moves the display information to column B, row 3, which corresponds to the somewhat low level of ease.

The controller 40 does not perform any control when the display information is at a matrix position corresponding to the classified level of ease or lower.

In this way, when moving display information towards a matrix position corresponding to the predicted level of ease, the controller 40 prioritizes the display position over the information amount of the display information. It is thought that the display information retains a higher value when the information amount is maintained than when the display position is changed. Accordingly, the controller 40 avoids reducing the information amount insofar as possible. The controller 40 moves the display information sorted into column C to column B. The controller 40 moves the display information that was moved to column B, row 3 to column A, row 3. For the display information moved to column B, row 1 and column B, row 2, the controller 40 performs control to lower the row within column B by reducing the information amount. The reason is that column A, row 1 and column A, row 2 are not associated with a level of ease due to the limit on the information amount of the HUD 51.

The controller 40 determines the final display position (column) and information amount (row) of the display information with the above-described control. The controller 40 outputs the display information to the display 50 based on the determined display position and information amount. The display 50 displays the display information.

Figure 8A:
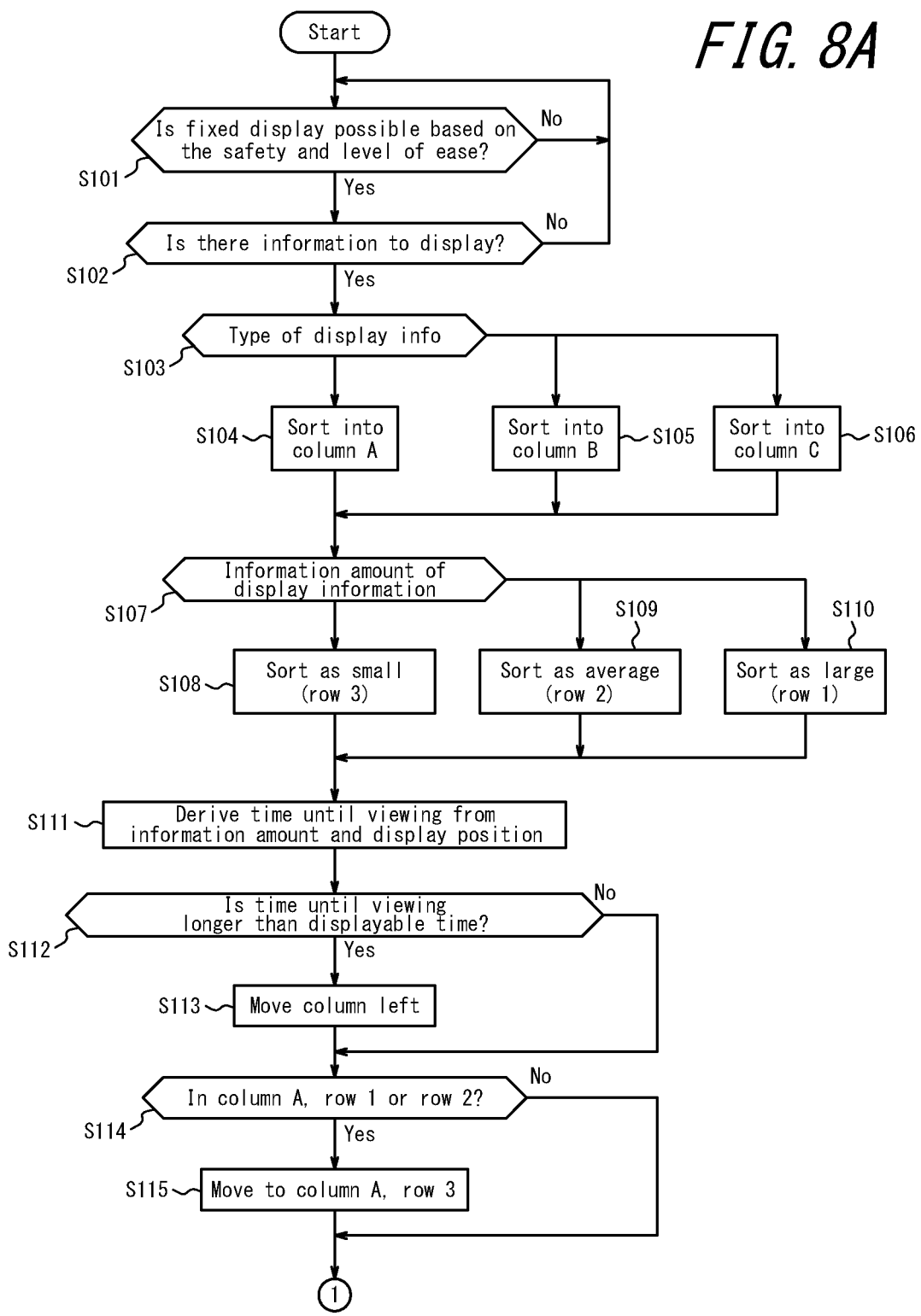
FIG. 8A is a first flowchart illustrating display information control performed by the controller of FIG. 1.
Figure 8B:
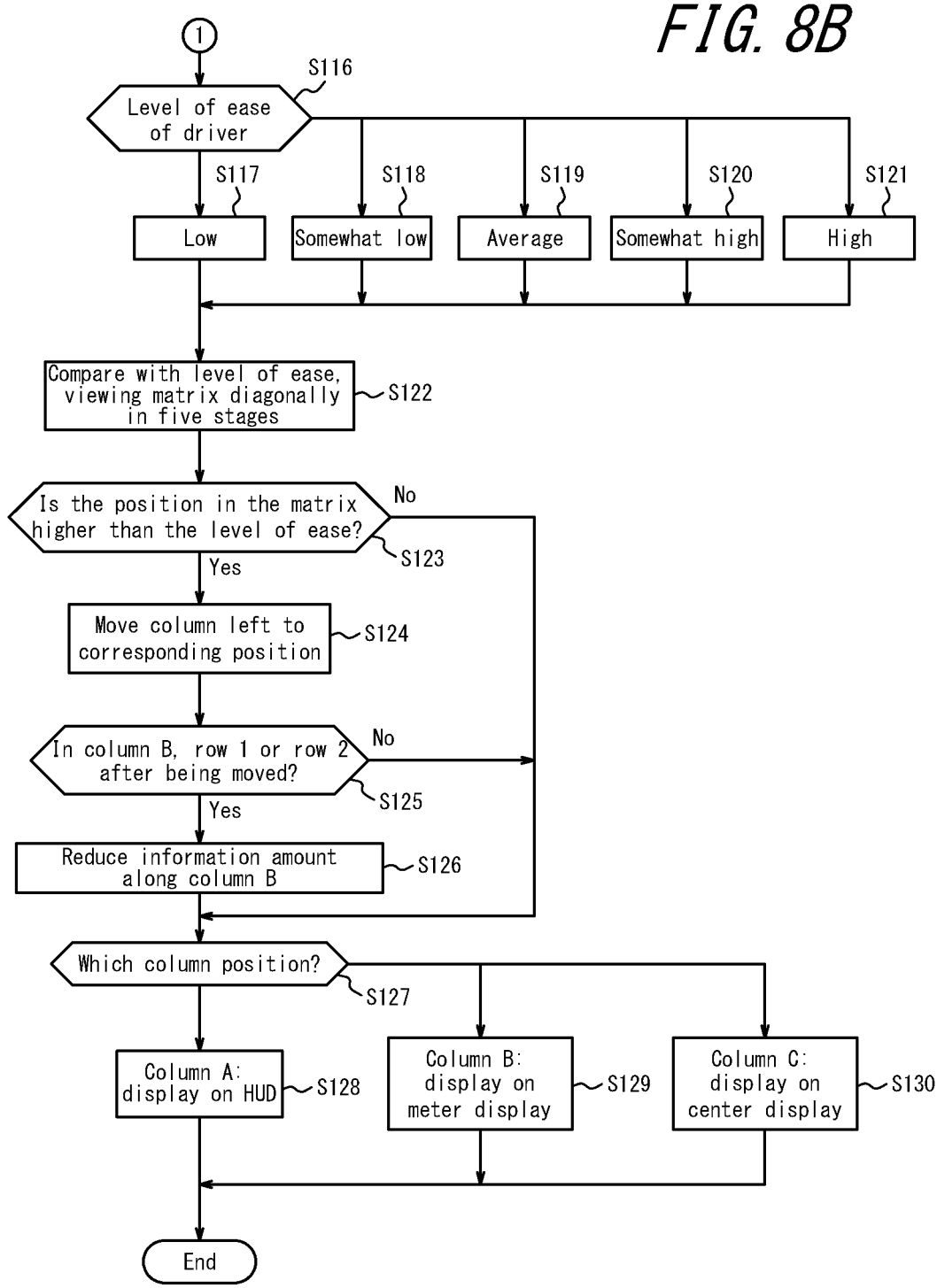
FIG. 8B is a second flowchart illustrating display information control performed by the controller of FIG. 1.

FIG. 8A is a first flowchart illustrating display information control performed by the controller 40 of FIG. 1. FIG. 8B is a second flowchart illustrating display information control performed by the controller 40 of FIG. 1.

Based on the predicted safety and level of ease, the controller 40 judges whether a fixed display is possible on the display 50 (step S101). The controller 40 returns to step S101 when judging that display is not possible. The controller 40 proceeds to step S102 when judging that display is possible.

The controller 40 judges whether there is information to be displayed on the display 50 (step S102). The controller 40 returns to step S101 when judging that there is no display information. The controller 40 proceeds to step S103 when judging that there is display information. At this time, the controller 40 acquires any information to be displayed on the display 50. For example, the controller 40 acquires SNS information, which is one type of information from a communication terminal.

The controller 40 classifies the type of acquired display information (step S103). The controller 40 sorts predetermined display information into column A, column B, and column C in accordance with urgency and importance (steps S104, S105, S106).

The controller 40 classifies the information amount of the display information (step S107). The controller 40 sorts the predetermined display information into "small (row 3)", "average (row 2)", and "large (row 1)" in accordance with the information amount (steps S108, S109, S110).

The controller 40 derives the time until viewing by the driver from the information amount and display position of the display information (step S111).

The controller 40 compares the derived time until viewing and predicted displayable time and judges whether the time until viewing is longer than the predicted displayable time (step S112). The controller 40 proceeds to step S113 when judging that the time until viewing is longer than the predicted displayable time. The controller 40 proceeds to step S114 when judging that the time until viewing is equal to or less than the predicted displayable time.

The controller 40 moves the display information to the column corresponding to the predicted displayable time when the time until viewing is longer than the predicted displayable time (step S113).

The controller 40 judges whether the display information is in column A, row 1 or column A, row 2 (step S114). The controller 40 proceeds to step S115 when judging that the display information is in column A, row 1 or column A, row 2. The controller 40 proceeds to step S116 when judging that the display information is in neither column A, row 1 nor column A, row 2.

The controller 40 moves the display information to column A, row 3 when the display information is in column A, row 1 or column A, row 2 (step S115).

The controller 40 classifies the predicted level of ease of the driver regarding driving (step S116). The controller 40 classifies the level of ease into the five stages "low", "somewhat low", "average", "somewhat high", and "high" (steps S117, S118, S119, S120, S121).

The controller 40 compares the classified level of ease and display information, viewing the matrix diagonally in five stages (step S122).

The controller 40 judges whether the compared display information is in a matrix position with a higher level of ease than the classified level of ease (step S123). When judging that the display information is in a matrix position with a higher level of ease than the classified level of ease, the controller 40 proceeds to step S124. When judging that the display information is in a matrix position with the same or lower level of ease than the classified level of ease, the controller 40 proceeds to step S127.

When the display information is in a matrix position with a higher level of ease than the classified level of ease, the controller 40 moves the column left to the corresponding position (step S124).

The controller 40 judges whether the display information is in column B, row 1 or column B, row 2 after the move (step S125). The controller 40 proceeds to step S126 when judging that the display information is in column B, row 1 or column B, row 2. The controller 40 proceeds to step S127 when judging that the display information is neither in column B, row 1 nor column B, row 2.

When the display information is in column B, row 1 or column B, row 2, the controller 40 reduces the information amount to move along column B to the matrix position corresponding to the classified level of ease (step S126).

The controller 40 judges the position of the column after movement (step S127). The controller 40 displays the display information on the HUD 51 with an appropriate information amount when the column after movement is column A (step S128). The controller 40 displays the display information on the meter display 52 with an appropriate information amount when the column after movement is column B (step S129). The controller 40 displays the display information on the center display 53 with an appropriate information amount when the column after movement is column C (step S130).

Prediction of Level of Ease and Judgment of Whether Information Provision is Possible Details are provided below on how the information control apparatus 1 predicts the level of ease and judges whether information provision is possible based on the level of ease.

One concrete method of predicting the level of ease is to apply VACP to vehicle driving. VACP is a method for dividing human actions into four elements, i.e. visual (V), auditory (A), cognitive (C), and psychomotor (P), and representing the actions numerically from 1.0 to 7.0 in accordance with the amount of cognitive resources consumed. The sum of the numerical values of the four elements indicates the load. The amount of cognitive resources consumed is defined by research using the paired comparison method. On this basis, the VACP value related to vehicle driving operations is estimated. The VACP value of driving operations by the driver is calculated using this reference, allowing the controller 40 to objectively predict the level of ease of the driver regarding driving. The controller 40 predicts that the level of ease of the driver regarding driving is high when the VACP value is low and that the level of ease of the driver regarding driving is low when the VACP value is high.

Figure 9:
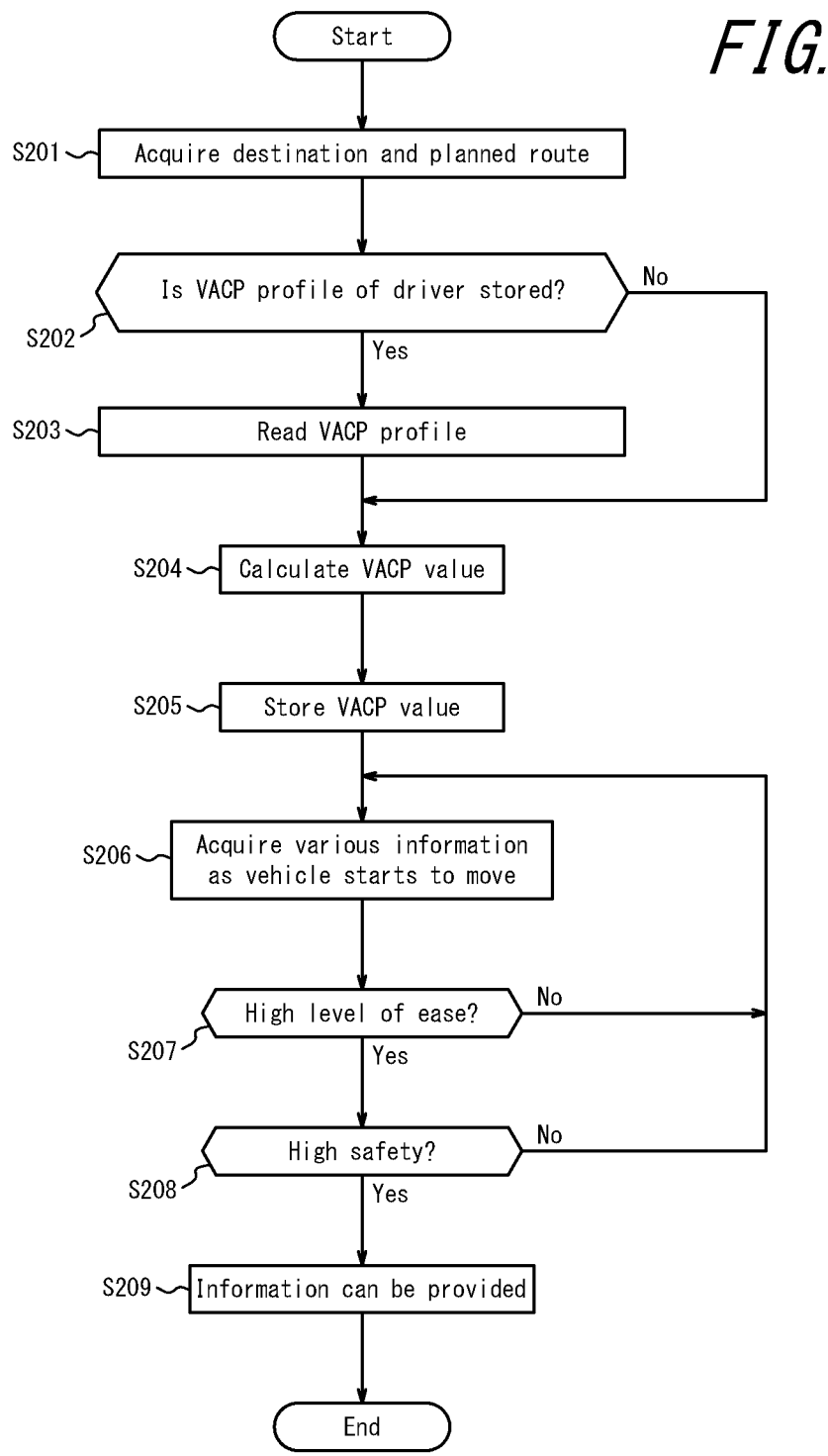
FIG. 9 is a flowchart illustrating an example of information provision control performed by the controller of FIG. 1.

FIG. 9 is a flowchart illustrating an example of information provision control performed by the controller 40 of FIG. 1. With reference to FIG. 9, the judgment by the controller 40 of whether information provision is possible based on the predicted level of ease is described. The flowchart in FIG. 9 describes step S101 in FIG. 8A in greater detail.

The driver or the like uses a car navigation system, for example, to set the destination and the planned route to the destination. The controller 40 acquires the destination and planned route information through the car navigation system (step S201).

The controller 40 judges whether a VACP profile for the current driver is stored individually in the storage 30 (step S202). When the controller 40 judges that a VACP profile for the current driver is stored, the process proceeds to step S203. When the controller 40 judges that a VACP profile for the current driver is not stored, the process proceeds to step S204.

When the controller 40 judges in step S202 that a VACP profile for the current driver is stored, the controller 40 reads the VACP of the current driver stored in the storage 30 (step S203).

The controller 40 predicts the level of ease of the driver by calculating the VACP value (step S204). Specifically, when the storage 30 stores the VACP profile for the current driver, the controller 40 corrects the VACP value of the driver to the destination, as calculated along the planned route, for each driver based on the VACP profile. When the storage 30 does not store the VACP profile for the current driver, the controller 40 may predict the level of ease directly using the VACP value of the driver to the destination, as calculated along the planned route.

The controller 40 stores the calculated VACP value, i.e. information related to the predicted level of ease of the driver, in the storage 30 (step S205).

When the vehicle starts to move, the controller 40 starts to acquire the various information described above using the vehicle information acquisition interface 10 and the driver information acquisition interface 20 (step S206).

The controller 40 judges whether the level of ease of the driver is currently high (step S207). Based on the current level of ease of the driver, the controller 40 judges whether information can be provided to the driver through the display 50. At this time, the controller 40 may perform real-time correction, in accordance with actual conditions, of the VACP value of the driver calculated in step S204. The controller 40 may correct the VACP value based on vehicle-related information acquired by the vehicle information acquisition interface 10. The controller 40 may perform real-time correction, in accordance with the state of the driver, of the VACP value of the driver calculated in step S204 by correcting the VACP value based on the driver-related information acquired by the driver information acquisition interface 20. When the controller 40 judges that the corrected VACP value is equal to or less than a predetermined threshold, the controller 40 predicts that the level of ease of the driver is high and proceeds to step S208. When the controller 40 judges that the corrected VACP value is greater than a predetermined threshold, the controller 40 predicts that the level of ease of the driver is low and returns to step S206.

The controller 40 judges whether the safety of the surroundings of the vehicle is currently high (step S208). Based on the current safety of the surroundings of the vehicle, the controller 40 judges whether information can be provided to the driver through the display 50. As described above, the controller 40 predicts the safety of the surroundings of the vehicle based on the vehicle-related information acquired by the vehicle information acquisition interface 10 and the driver-related information acquired by the driver information acquisition interface 20, and based on a safety prediction model. In this step, the controller 40 executes one or more calculation tasks and only judges that information can be provided when judging that doing so is safe in all of the tasks. For example, the controller 40 associates tasks with the relationship to vehicles ahead, the conditions of crossroads, and the relationship to nearby pedestrians and judges the safety of each task. In this case, the controller 40 predicts that the safety is high and proceeds to step S209 only when the relationship to vehicles ahead is safe, the conditions of crossroads are safe, and the relationship to nearby pedestrians is safe. In all other cases, the controller 40 predicts that the safety of the surroundings of the vehicle is low and returns to step S206.

When the controller 40 predicts that both the level of ease and the safety are high, the controller 40 determines that information can be provided to the driver through the display 50 (step S209).

The information control apparatus 1 configured in this way can optimize display control based on safety around the vehicle and the driver's level of ease regarding driving. The information control apparatus 1 can display information in a state with an optimal time until viewing by changing at least one of the display position and the information amount of the display information as necessary on the basis of the safety of the environment around the vehicle and the level of ease of the driver. For example, unlike a known configuration, the information control apparatus 1 can provide information safely, even when the driver feels comfortable while driving and does not find the display of information problematic. Received display information of which, until now, the driver had been notified independently from the vehicle can be acquired by the driver at a safe timing in cooperation with the vehicle.

The information control apparatus 1 can perform highly accurate display control in conjunction with an individual driver by predicting the safety and level of ease based on information related to driver operations and information related to the intention of the driver's operations. For example, the information control apparatus 1 can display information in an optimal state in conjunction with the driver's degree of driving experience. The information control apparatus 1 can similarly perform highly accurate display control in conjunction with an individual driver by predicting the safety and level of ease based on information related to other states of the driver. For example, the information control apparatus 1 can display information in an optimal state in conjunction with the driver's physical condition on a given day.

The information control apparatus 1 can evaluate the level of ease of the driver regarding driving objectively and quantitatively by using VACP to predict the level of ease. In this way, the information control apparatus 1 can perform display control more accurately to display information in an optimal state. The information control apparatus 1 can perform display control even more accurately by correcting the VACP value of the driver in real time based on information related to the vehicle and the driver. The information control apparatus 1 can display information in an optimal state in conjunction with the current vehicle environment and state of the driver.

The information control apparatus 1 facilitates display control by fixing the display position based on the type of display information. The information control apparatus 1 can heighten the driver's awareness of urgent and important display information by displaying the display information at a display position determined in advance in light of urgency and importance.

By changing the display position for each predetermined sender, the information control apparatus 1 makes it easier for the driver to identify the sender of display information. For example, the driver can predict, to a certain degree, who sent an email message in accordance with the display position.

The information control apparatus 1 can reduce the burden on the driver for recognizing information while driving by controlling the display position based on the information amount of the display information. By display information with a small information amount being displayed on the HUD 51 that overlaps the driver's field of view, for example, the driver can continue to focus on driving with little loss of concentration. For example, by display information with a large information amount being displayed on the center display 53, which has a relatively large display screen, the driver can easily see the information in its entirety.

The information control apparatus 1 can measure the information amount of the display information more objectively by defining the information amount according to the chunk count. The information control apparatus 1 can thereby sort the display information onto the matrix more accurately.

By controlling at least one of the display position and the information amount of the display information based on the predicted displayable time, the information control apparatus 1 can display the display information in an optimal state that takes into account the safety of the environment surrounding the vehicle. The information control apparatus 1 can display the display information while securing driver safety.

The information control apparatus 1 can extract only the information that is particularly necessary by reducing the information amount as a result of at least one of summarizing and extracting the display information. This allows the driver to learn just the essential points of the display information accurately. The driver can obtain an overview of necessary information at a safe timing.

The information control apparatus 1 can display the display information appropriately on each display 50 by placing a limit on the information amount based on the type or position of the display 50. The information control apparatus 1 thus facilitates recognition of information when the driver looks at the display 50.

The information control apparatus 1 can reduce the time until viewing while securing the information amount by prioritizing a change in the display position over a change in the information amount when controlling the display information based on the level of ease. The information control apparatus 1 can thereby display the display information without omission in a state with a low visual burden on the driver.

Although the present disclosure has been explained with reference to the drawings and examples, it is to be noted that various changes and modifications will be apparent to those of ordinary skill in the art based on the present disclosure. Therefore, such changes and modifications are to be understood as included within the scope of the present disclosure. For example, the functions and the like included in the various means and steps may be reordered in any logically consistent way. Means or steps may also be combined into one or divided.

REFERENCE SIGNS LIST

1 Information control apparatus
10 Vehicle information acquisition interface
11 Surrounding information acquisition interface
12 Vehicle position acquisition interface
20 Driver information acquisition interface
30 Storage
40 Controller
50 Display
51 HUD
52 Meter display
53 Center display

The invention claimed is:

1. An information control apparatus comprising:
a vehicle information acquisition interface configured to acquire information related to a vehicle;
a driver information acquisition interface configured to acquire information related to a driver; and
a controller configured to predict safety around the vehicle and a level of ease of the driver regarding driving based on the information related to the vehicle and the information related to the driver and configured to control display information based on the safety and the level of ease;
wherein the controller is configured to control at least one of a display position and an information amount of the display information based on a predicted displayable time determined by a planned route of the vehicle and the safety, and
wherein the controller is configured to control at least one of the display position and the information amount of the display information based on a comparison of a time until viewing by the driver and the predicted displayable time.

2. The information control apparatus of claim 1, wherein the driver information acquisition interface is configured to acquire information related to an operation by the driver and acquire information related to an operation intention of the driver based on the information related to the vehicle acquired by the vehicle information acquisition interface.

3. The information control apparatus of claim 1, wherein the controller is configured to predict the safety by calculating a VACP value of a driving operation by the driver.

4. The information control apparatus of claim 1, wherein the controller is configured to determine a display position based on a type of the display information.

5. The information control apparatus of claim 4, wherein the display information is transmitted by predetermined senders, and the controller is configured to change the display position of the display information by sender.

6. The information control apparatus of claim 1, wherein the controller is configured to control a display position based on an information amount of the display information.

7. The information control apparatus of claim 6, wherein the information amount is determined by a chunk count defined by a character count, a word count, a count of phrases, icons, and figures, or a count of attention points in graphic form.

8. The information control apparatus of claim 1, wherein the controller is configured to reduce the information amount by at least one of summarizing and extracting the display information.

9. The information control apparatus of claim 1, further comprising:
   a display configured to display the display information;
   wherein the controller is configured to place a limit on an information amount of the display information based on a type or a position of the display and is configured to reduce the information amount based on the limit.

* * * * *